United States Patent
Phillips

(10) Patent No.: US 11,175,398 B2
(45) Date of Patent: *Nov. 16, 2021

(54) METHOD AND APPARATUS FOR MULTIPLE RAW SENSOR IMAGE ENHANCEMENT THROUGH GEOREGISTRATION

(71) Applicant: The Boeing Company, Chicago, IL (US)

(72) Inventor: Daniel T. Phillips, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 542 days.

This patent is subject to a terminal disclaimer.

(21) Appl. No.: 15/387,493

(22) Filed: Dec. 21, 2016

(65) Prior Publication Data

US 2018/0172822 A1    Jun. 21, 2018

(51) Int. Cl.
*G01S 13/90*  (2006.01)
*G06T 7/70*  (2017.01)
*G06T 7/30*  (2017.01)

(52) U.S. Cl.
CPC ............ *G01S 13/90* (2013.01); *G06T 7/30* (2017.01); *G06T 7/70* (2017.01);
(Continued)

(58) Field of Classification Search
CPC ............ G01S 13/89–9094; G06T 7/70; G06T 2207/30244; G06T 2207/10032;
(Continued)

(56) References Cited

U.S. PATENT DOCUMENTS 6,738,532 B1    5/2004  Oldroyd
7,395,156 B2 *  7/2008  Chiou .................. G01S 7/40
                                                    342/65

(Continued)

FOREIGN PATENT DOCUMENTS

EP    1742084       1/2007
TW    I522650 B     2/2016

(Continued)

OTHER PUBLICATIONS

R.N, Nagashree. (Sep. 2016). A Survey on SAR image Georegistration and Orthorectification. International Journal of Mechanical Engineering and Information Technology. 10.18535/ijmeit/v4i9.05. (Year: 2016).*

(Continued)

*Primary Examiner* — Matthew M Barker
(74) *Attorney, Agent, or Firm* — Gates & Cooper LLP

(57) ABSTRACT

A method and apparatus for generating an image from raw sensor data. In one embodiment, the method comprises reading a plurality of raw sensor data sets from one or more sensors at a plurality of sensor inertial states, generating an estimate of each of the plurality of sensor inertial states, and while retaining each of the raw sensor data sets, generating an image, the image generated at least in part from the plurality of estimated sensor inertial states and the plurality of raw sensor data sets, and generating an updated estimate of at least one of the sensor inertial states, the updated estimate of the at least one of the sensor inertial states generated at least in part from the generated image and the plurality of estimated sensor inertial states. Finally, an enhanced image is generated from the retained raw sensor data sets and the updated estimate of the at least one of the sensor inertial states.

20 Claims, 9 Drawing Sheets

(52) U.S. Cl.
CPC .............. *G06T 2207/10032* (2013.01); *G06T 2207/10044* (2013.01); *G06T 2207/30244* (2013.01)

(58) Field of Classification Search
CPC ....... G06T 7/30–38; G06T 2207/30181; G06T 2207/10044; G01C 21/165; G01C 11/06; G01C 21/20
See application file for complete search history.

(56) References Cited

U.S. PATENT DOCUMENTS

| | | | |
|---|---|---|---|
| 7,580,591 | B2 | 8/2009 | Oldroyd |
| 7,873,240 | B2 | 1/2011 | Oldroyd |
| 10,204,454 | B2 * | 2/2019 | Goldman ................. G06T 7/344 |
| 2001/0038718 | A1 | 11/2001 | Kumar et al. |
| 2003/0225513 | A1 * | 12/2003 | Gagvani ................. G06T 15/04 |
| | | | 701/431 |
| 2004/0008866 | A1 * | 1/2004 | Rhoads ................. G06T 1/0021 |
| | | | 382/100 |
| 2005/0220363 | A1 | 10/2005 | Oldroyd |
| 2007/0002138 | A1 | 1/2007 | Oldroyd |
| 2007/0127101 | A1 | 6/2007 | Oldroyd |
| 2012/0050525 | A1 * | 3/2012 | Rinner ................. G06T 7/33 |
| | | | 348/117 |
| 2017/0329335 | A1 | 11/2017 | DelMarco et al. |
| 2019/0196005 | A1 * | 6/2019 | Calabrese ............. G01S 7/4021 |

FOREIGN PATENT DOCUMENTS

| | | | |
|---|---|---|---|
| WO | 03101110 | 12/2003 | |
| WO | 2016187759 | 12/2016 | |
| WO | WO-2017221166 A1 * | 12/2017 | ........... G01S 7/4021 |

OTHER PUBLICATIONS

Extended European Search Report dated Feb. 22, 2018 for European Patent Application No. 17208518.5.
European Examination Report dated Feb. 21, 2019 for European Patent Application No. 17208518.5.
European Examination Report dated Feb. 25, 2020 for European Patent Application No. 17208518.5.
Summons to Attend Oral Proceedings dated Nov. 27, 2020 for European Patent Application No. 17208518.5.
Taiwanese Office Action dated Apr. 20, 2021for TW Application No. 106144411.
Taiwanese Office Action (with English translation) dated Jul. 22, 2021 for Taiwanese Patent Application No. 106144411.

* cited by examiner

METHOD AND APPARATUS FOR MULTIPLE RAW SENSOR IMAGE ENHANCEMENT THROUGH GEOREGISTRATION

CROSS-REFERENCE TO RELATED APPLICATIONS

This application is related to the following co-pending and commonly assigned patent application, which applications are incorporated by reference herein:

Application Ser. No. 15/387,486, entitled "METHOD AND APPARATUS FOR RAW SENSOR IMAGE ENHANCEMENT THROUGH GEOREGISTRATION," filed on same date herewith, by Daniel T. Phillips, issued Oct. 13, 2020 as U.S. Pat. No. 10,802,135.

BACKGROUND

1. Field

The present disclosure relates to systems and methods for generating images from raw sensor data, and in particular to a system and method for enhancing such image generation through georegistration.

2. Description of the Related Art

Image registration is the process of transforming different sets of image data into a single coordinate system. The image data used in the registration process typically comprises multiple images, of substantially the same scene, and such images may be taken at the same time, or at different times or viewpoints. Data registration techniques are used in computer vision, medical imaging, military automatic target recognition, and compiling and analyzing images and data from satellites. Registration is necessary in order to be able to compare or integrate the data obtained from these different measurements.

In some cases, images may be registered in conjunction with reference views synthetic models of the same scene depicted in the image(s). For example, U.S. Patent Publication 2005/0220363, which is hereby incorporated by reference herein, depicts a processing architecture for automatically registering images with a reference image database and/or a digital elevation model (DEM).

The collection of sensor data and subsequent image processing is distorted by the uncertainty of the location of the sensor taking the raw sensor measurements. This is due to uncertainties in the navigation system of the platform upon which the sensor is mounted, errors in the image registration process, and that only a limited set of reference elevation data is typically available to process the image.

What is needed is a system and method that reduces such distortion. Such a system and method is disclosed below.

SUMMARY

To address the requirements described above, this document discloses a system and method for generating an image from raw sensor data. In one embodiment, the method comprises reading a plurality of raw sensor data sets, each raw sensor data set read from one or more sensors at a plurality of sensor inertial states, generating an estimate of each of the plurality of sensor inertial states, and retaining each of the raw sensor data sets. Each of the raw sensor data sets are retained while generating an image at least in part from the plurality of estimated sensor inertial states and the plurality of raw sensor data sets and generating an updated estimate of at least one of the sensor inertial states, wherein the updated estimate of the at least one of the sensor inertial states is generated at least in part from the generated image and the plurality of estimated sensor inertial states. Finally an enhanced image is generated from the retained raw sensor data sets and the updated estimate of the at least one of the sensor inertial states. Another embodiment is evidenced by means for performing the above operations.

Still another embodiment is evidenced by an apparatus for generating an image from raw sensor data that comprises a sensor for generating raw data, an image processor, communicatively coupled to the sensor, for reading a plurality of raw sensor data sets from the sensor, each raw sensor data set read from the sensor at a plurality of sensor inertial states, an inertial navigation system, communicatively coupled to the sensor, for generating an estimate of each of the plurality of sensor inertial states, an image processor, communicatively coupled to the sensor and the inertial navigation system, for generating an image, the image generated at least in part from the plurality of estimated sensor inertial states and the plurality of raw sensor data sets; and a georegistration system, communicatively coupled to the inertial navigation system and the image processor, for generating an updated estimate of at least one of the sensor inertial states, the updated estimate of the at least one of the sensor inertial states generated at least in part from the generated image and the plurality of estimated sensor inertial states. In this embodiment, the image processor generates an enhanced image from the retained raw sensor data sets and the updated estimate of the at least one of the sensor inertial states and the sensor retains each of the raw sensor data sets while the image is generated from the raw sensor data and the updated estimate of the at least one of the sensor inertial states is generated. Still another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Unlike existing systems and methods for generating images from raw sensor data, the system and method described herein retains raw sensor image data (e.g. Synthetic Aperture Radar (SAR) IQ Collection Data). Upon successful georegistration to high resolution reference imagery, the raw sensor data is reprocessed with calculated enhanced sensor location and reference imagery data resulting in an enhanced output sensor image of greater accuracy and reduced distortions, for example, reprocess raw sensor SAR data using an algorithm like back projection whose main benefit would be seen in high-resolution collections with significant of out-of-plane acceleration. Other distortions that could be improved include foreshortening and layover distortions, which are problematic in SAR applications.

Platform

Figure 1:
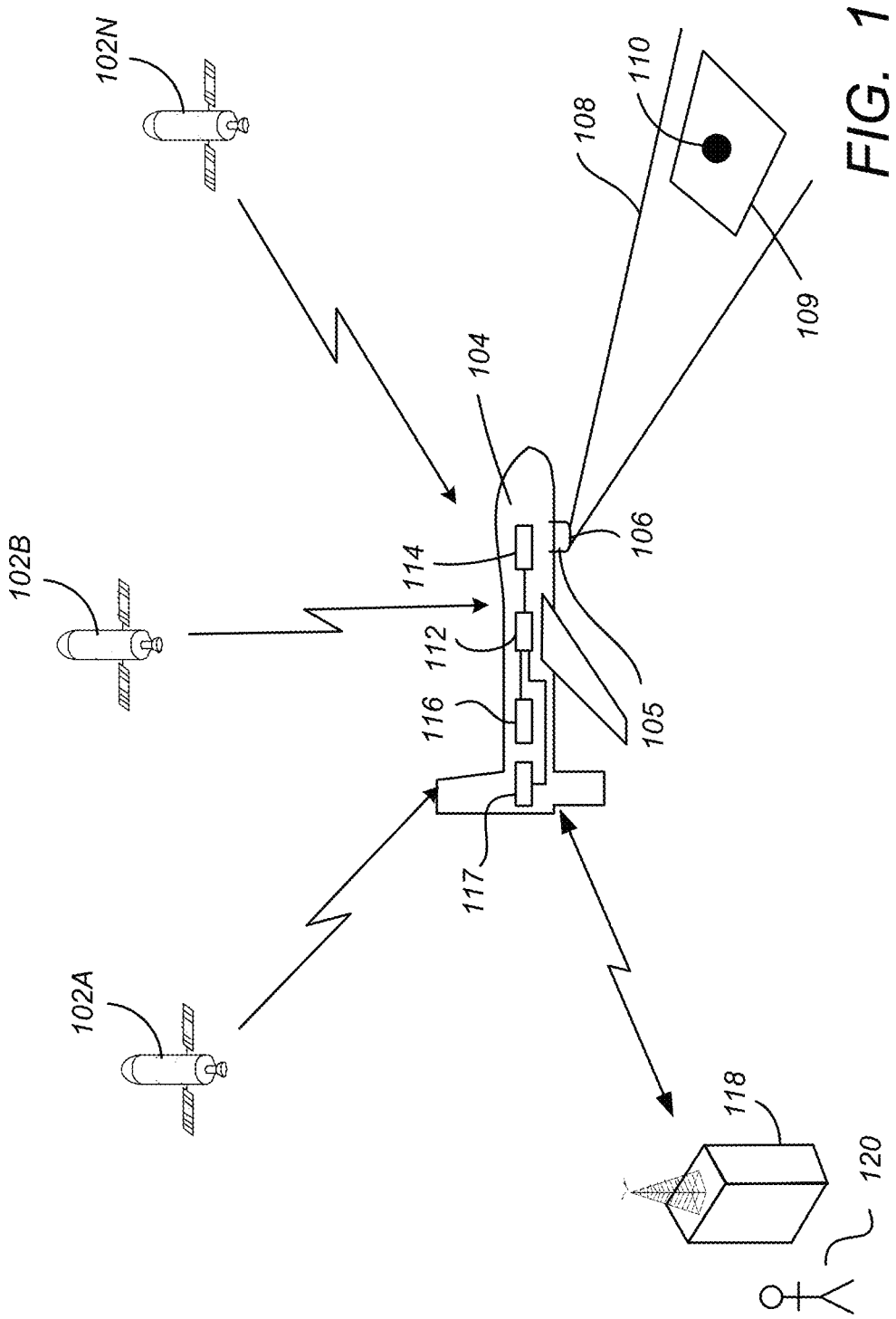
FIG. 1 is a diagram illustrating the operation of a sensor platform.

FIG. 1 is a diagram illustrating the operation of a sensor platform 104 (alternatively referred to hereinafter as platform). The sensor platform 104 may operate in the Earth's atmosphere or space, and may be unmanned or manned. In one embodiment, the sensor platform is an unmanned air vehicle (UAV). The platform 104 typically includes a sensor 106 (which may be mounted on a rotatable turret 105) having a field of view (FOY) 108 that surveils targets 110 on or near the ground.

The platform 104 also typically comprises a processor 112 communicatively coupled to a memory 116 storing processor instructions for performing the operations described herein, as well as a means for taking inertial measurements of the motion of the platform 104, and translating these measurements into an estimate of the inertial state of the platform 104 or, via suitable coordinate transformations, the sensor 106 such as an inertial navigation system (INS) 114. Typically, the INS 114 comprises an inertial reference unit (IRU) that includes three accelerometers providing acceleration measurement in three orthogonal directions, and three rate sensors such as gyros that sense rotation in three orthogonal directions. Typically, the INS 114 may also comprise another receiver for receiving global navigation information, such as is available from systems such as the global positioning system (GPS). GPS includes a plurality of satellites 102A-102N which transmit signals that the INS 114 uses to assist in the determination of its position in inertial space. In some applications, the INS 114 may also comprise a star tracker or other means for estimating position.

In one embodiment, the platform 104 also comprises a receiver 117, communicatively coupled to the processor 112, for transceiving commands and other information with a ground station 118. Using computers and other equipment in the ground station 118, users 120 provide commands to the platform 104 and receive data, including data obtained by the sensor 106.

Sensor Embodiments

In one embodiment, the sensor 106 comprises a SAR which scans a scene 109 including the target 110, and constructs an image of the target 110 and/or scene 109 with raw sensor data generated from such scans.

SAR is a coherent mostly airborne or space borne side looking radar system which utilizes the flight path of the platform 104 to simulate an extremely large antenna or aperture electronically, and that generates high-resolution remote sensing imagery. Over time, individual transmit/receive cycles are completed with the data from each cycle being stored electronically. The signal processing uses magnitude and phase of the received signals over successive pulses from elements of a synthetic aperture. After a given number of cycles, the stored data is recombined (taking into account the Doppler effects inherent in the different transmitter to target geometry in each succeeding cycle) to create a high resolution image of the terrain being over flown.

SAR works much like a phased array, but instead of a large number of the parallel antenna elements of a phased array, SAR uses one antenna (which produces a beam that can steered mechanically or electronically) and time-multiplexes the measurements to simulate a large aperture sensor. The different geometric positions of the antenna elements are result of the moving platform 104.

The image processor stores all the radar returned signals, as amplitudes and phases, over a time period, with each signal representing data taken from an associated position in inertial space. Now it is possible to reconstruct the signal which would have been obtained by an antenna of length v·T, where v is the platform speed, and T is the time period. As the line of sight direction changes along the radar platform trajectory, a synthetic aperture is produced by signal processing that has the effect of lengthening the antenna. Making T large makes the "synthetic aperture" large and hence a higher resolution can be achieved.

As the target 110 first enters the radar beam, the backscattered echoes from each transmitted pulse begin to be recorded. As the platform continues to move forward, all echoes from the target for each pulse are recorded during the entire time that the target is within the beam. The point at which the target leaves the view of the radar beam some time later, determines the length of the simulated or synthesized antenna. The synthesized expanding beamwidth, combined with the increased time a target is within the beam as ground range increases, balance each other, such that the resolution remains constant across the entire swath. The achievable azimuth resolution of a SAR is approximately equal to one-half the length of the actual (real) antenna and does not depend on platform altitude (distance). The process of generating the image may be thought of as a process wherein the incoming raw sensor data is provided to a shift register with the arrival of each new raw sensor data causing the previously measured raw data to be shifted to an adjacent shift register element, and the new data placed into the vacated element. The data from each shift register is then combined using an arithmetic operation or processing function, with the resolution of the image improving as each new raw image data set is processed (a result expected, as each new measurement increases the "aperture" associated with the total of the image data. Typically, once the image is generated, the data in the shift registers is deleted or written over, thus eliminating the possibility that improvements in estimates of the inertial state of the sensor (generated from the image via georegistration) can be used to improve the quality of the image.

Hence, SAR generates an image using successive instances of raw image data, which combined using SAR image processing techniques, combines each data instance, taken at different points in inertial space to create a complete image. The accuracy of the resulting image depends upon several factors, including the accuracy of any determination of the platform 104 position when each successive image is taken. The requirements for such a system is a stable, fully coherent transmitter, an efficient and powerful SAR image processor, and knowledge of the flight path and/or velocity of the sensor.

SAR is subject to slant-range distortions, including foreshortening, layover, and shadowing effects. Such slant-range distortion occurs because the radar is measuring the distance to features in slant-range rather than the true horizontal distance along the ground. This results in a varying image scale, moving from near to far range. Foreshortening occurs when the radar beam reaches the base of a tall feature tilted towards the radar (e.g. a mountain) before it reaches the top. Because the radar measures distance in slant-range and not horizontal range, the slope appears compressed and the length of the slope will be represented incorrectly at the image plane. Layover occurs when the radar beam reaches the top of a tall feature before it reaches the base. The return signal from the top of the feature will be received before the signal from the bottom. As a result, the top of the feature is displaced towards the radar from its true position on the ground, and "lays over" the base of the feature. The shadowing effect increases with greater incident angle θ, just as our shadows lengthen as the sun sets. Compensating for all of such slant range distortions is possible, but such compensation depends at least in part upon an accurate knowledge of the inertial state of the sensor (e.g. its position and/or velocity). A description of the basic principles of SAR is presented at http://www.radartutorial.eu/20.airborne/ab07.en.html In another embodiment, the sensor 106 comprises a planar imaging sensor which also scans the scene 109 including the target 110, and constructs an image of the target 110 and/or scene 109 with raw sensor data generated from such scans. Typically, the planar imaging sensor comprises a camera permitting the capture of a sequence of images, such as a movie camera, and may sense energy in visible, infrared (IR) or ultraviolet wavelengths. In some applications the planar sensor collects data in other wavelengths across the electromagnetic spectrum. Typically, the imaging sensor 106 can be oriented by maneuvering the platform 104 in pitch, yaw and roll, and may also be oriented independent of the platform 104 body in tilt and pan directions. Such tilting and panning may be accomplished electronically or mechanically, using the turret 105 or similar structure.

Georegistration System

Figure 2:
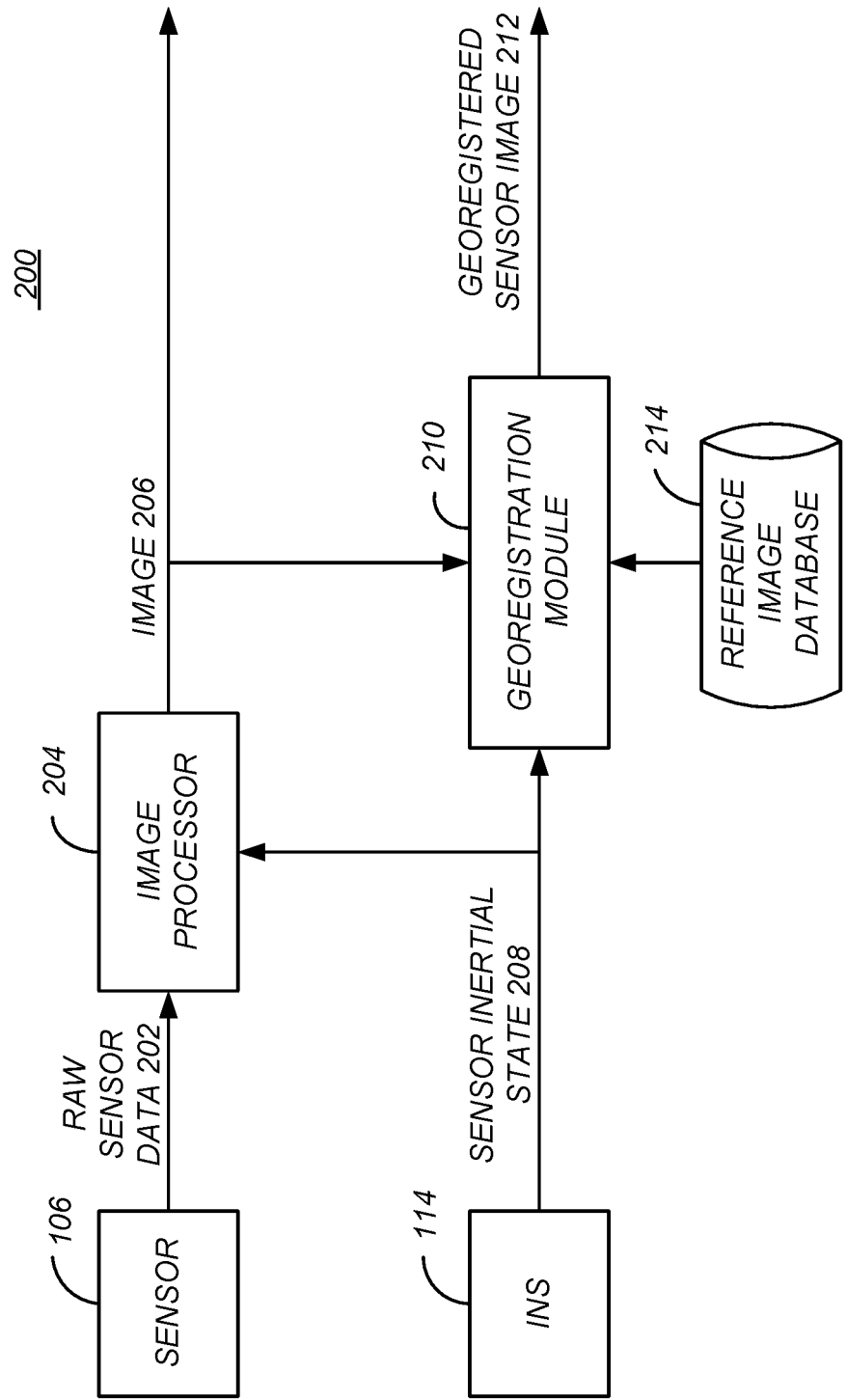
FIG. 2 is a diagram presenting an exemplary georegistration system.

FIG. 2 is a diagram presenting an exemplary georegistration system 200. The georegistration system comprises the sensor 106, communicatively coupled to an image processor 204. The image processor 204 processes the raw sensor data 202 to generate the image 206. Typically, the image processor 204 is a special purpose processor dedicated to the purpose of generating the image 206, and is distinct from platform processor 112. However, the platform processor 112 may also be used to perform the functions of the image processor 204.

The georegistration system 200 also comprises the INS 114, communicatively coupled to the image processor 204. As described above, the INS 114 generates estimates of the inertial state of the platform 104, and by suitable coordinate transformation, the sensor 106, over time. The sensor inertial state 208 may include, for example, the position, velocity, acceleration, attitude or attitude rate of the sensor 106. These states may be expressed with respect to an inertial coordinate space, which may be in Cartesian, polar, or other coordinate schemes (NED, ECEF, System/Sensor Body). For simplicity, one or more estimates of the position, velocity, acceleration, attitude, or attitude rate of the sensor corresponding to one or more raw sensor data collection events is defined as Sensor Inertial State and Raw Sensor Data, respectively.

The image processor 204 receives the raw sensor data 202 and processes this data to generate an image. In the embodiment wherein the sensor 106 is a SAR, the image processor 204 receives raw IQ sensor data 202 from the sensor 106 taken at a plurality of physical sensor 106 locations, and using an estimate of the physical location of the sensor 106 when each such raw sensor data was taken, generates image 206.

The image 206 and sensor inertial state 208 is provided to a georegistration module 210. The georegistration module 210 generates a georegistered sensor image 212 from the sensor inertial state 208, the image 206, and reference imagery and/or other reference geospatial data (e.g. Elevation) from a reference image database.

Figure 3:
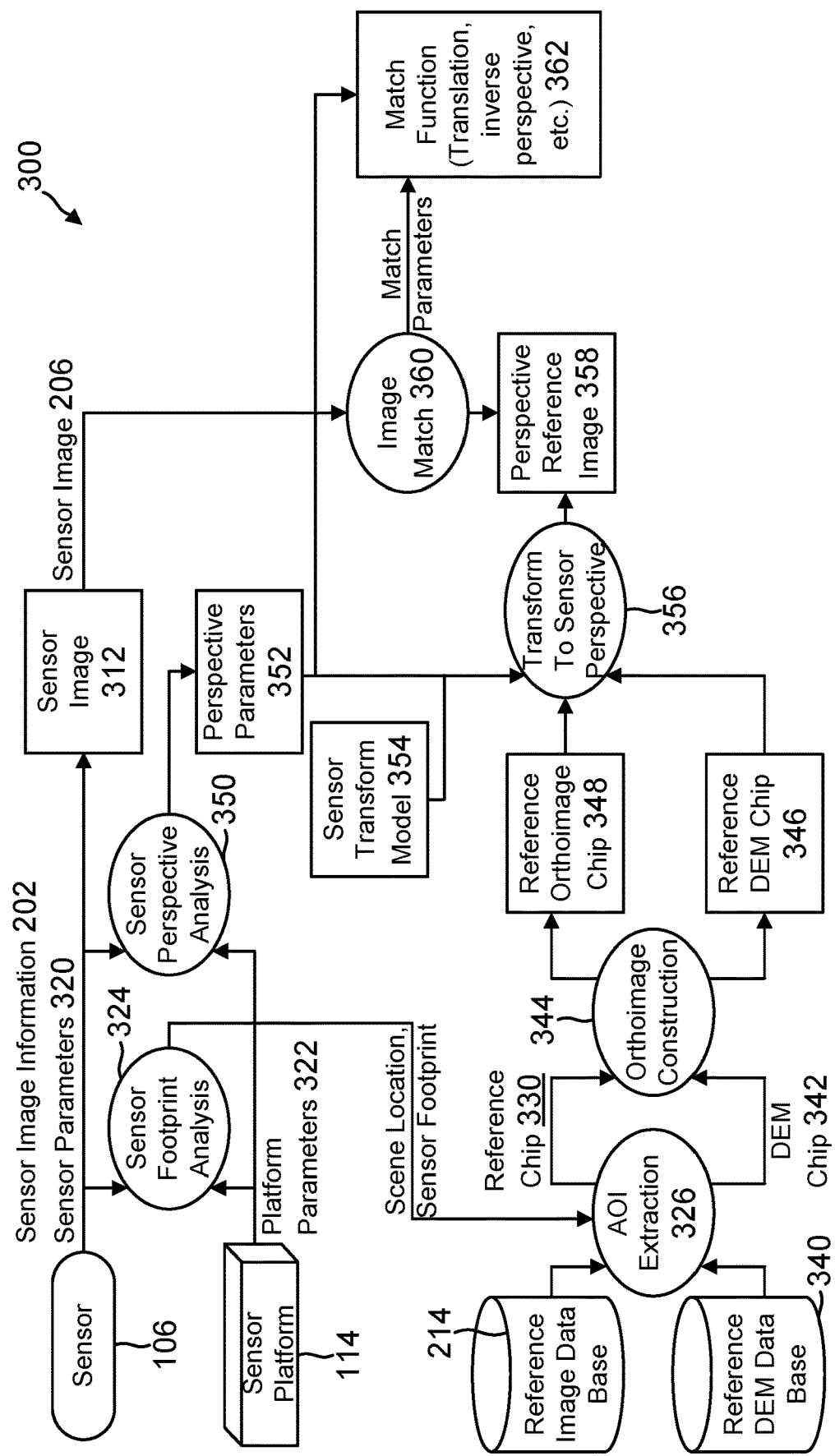
FIG. 3 is a diagram illustrating a more detailed embodiment of a georegistration system

FIG. 3 is a diagram illustrating a more detailed embodiment of a georegistration system 300. Platform parameters 322 (which can be transformed to the sensor inertial state 208) and sensor parameters 332 (e.g. field of view or FOV) are provided to a sensor footprint analysis module 324 to generate an estimate of the location of the scene depicted by the image and the sensor footprint. That information is provided to an area of interest (AOI) extraction module 326, which uses the reference image database 214 and a reference digital elevation model (DEM) database 340 to generate a reference chip 330 and a DEM chip 342.

The platform parameters 322 and sensor parameters 320 are also provided to a sensor perspective analysis module 350, which generates perspective parameters 352 that are used, along with a sensor transform model 354 describing the relationship between the platform and the sensor, to generate a transform for transforming reference images to the sensor perspective. The reference chip 330 and DEM chip 342 are provided to an orthoimage construction module 344 to generate a reference orthoimage chip 348 and a reference DEM chip 346, which are transformed into the sensor perspective by sensor perspective module 356 to generate a perspective reference image 358. The perspective reference image 358 is matched with a sensor image generated from the raw sensor data by image matching module 360 to generate match parameters. These match parameters define a matching function 362 which reflects a transform (e.g. translation, rotation, inverse perspective, etc.) to match the sensor image with the perspective reference image. An exemplary embodiment of the foregoing system is further described in U.S. Patent Publication 2005/0220363, which is hereby incorporated by reference.

This georegistered image 212 can be used to increase the accuracy of the determination of the inertial state of the sensor 106 occurring at the time(s) of collection and hence the platform 104 itself. Importantly, and as discussed below, if the raw sensor data 202 is retained, this more accurate data regarding the inertial state of the sensor 106 can also be used to generate an enhanced (e.g. better quality) image 206. To accomplish this, the raw sensor data 202 must be retained or otherwise stored so the image processing used to generate the image 206 is repeated (e.g. performed again) using the more accurate sensor 106 inertial state data. Hence, upon successful georegistration to high resolution reference imagery, the raw sensor data 202 is reprocessed with calculated enhanced sensor location and reference imagery data resulting in an enhanced output sensor image of greater accuracy and reduced distortions (e.g. out of plane acceleration, foreshortening and layover).

Enhanced Image Generation

Figure 4A:
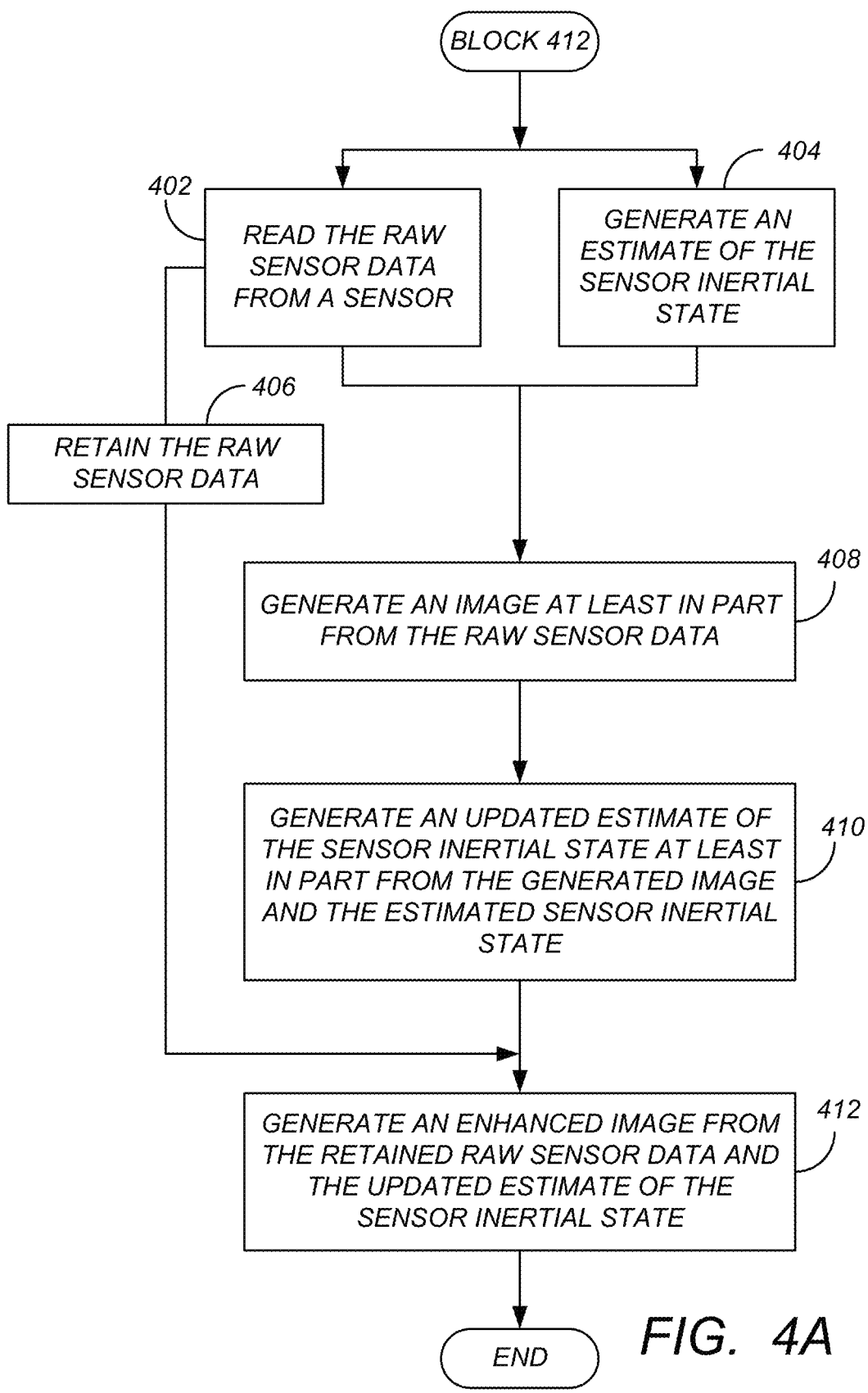
FIGS. 4A-4D are a diagrams presenting exemplary process steps that can be used to generate an image from raw sensor data.

FIGS. 4A-4D are a diagrams presenting exemplary process steps that can be used to generate an image 206 from raw sensor data 202. Turning first to FIG. 4A, in block 402, the raw sensor data 202 is read from the sensor 106. In block 404, a estimate of the sensor inertial state 208 is generated by the INS 114. Typically, the process of reading the raw sensor data 202 and the process of generating an estimate of the inertial state of the sensor 106 are performed concurrently by independent processes, with digital data from each process time-tagged so as to allow the raw sensor data 202 to be correlated with the estimated sensor inertial state 208 when the raw sensor data 202 was read. Hence, the inertial estimate sensor inertial state 208 may be generated during or concurrently with the reading of the raw sensor data from the sensor 106.

As depicted in block 406, the raw sensor data 202 is retained or otherwise stored for later use in generating an updated (or enhanced) version of image 206. In one embodiment, this is accomplished by storing the raw sensor data 202 in a memory (e.g. memory 502 illustrated in FIG. 5) separate from the sensor 106. In other embodiments, this is accomplished by storing the raw sensor data 202 in a memory of the sensor 106 itself, in a memory that is a part of or is accessible to the image processor 204, or the platform processor 112.

As shown in block 408, an image 206 is generated at least in part from the raw sensor data 202. This can be accomplished, for example, using the image processor 204 illustrated in FIG. 5. In one embodiment, the raw sensor data comprises data obtained from a planar imaging sensor such as an infra-red or visible light sensor having an array of elements sensitive to infra-red or visible light. In this embodiment, the image can be generated from the raw sensor data without the estimated inertial sensor state, as the location of the sensor when the raw data was read is not required to generate the image. While not required to generate the image, this data may be utilized as a second sensor data input to enhance the estimate of the inertial state of the platform as in FIG. 4C.

In another embodiment, the estimated sensor inertial state 208 is required for the image processor 204 to generate the image. For example, in applications where the image 206 is generated by combining raw sensor data 202 from taken from a plurality of sensor 106 locations (e.g. synthetic aperture systems such as SAR), the image 206 is generated using not only the raw sensor data 202, but also the inertial state of the sensor 106 when the raw sensor data 202 was taken.

As shown in block 410, an updated estimate of the sensor inertial state is generated at least in part from the generated image 206 and the estimated sensor inertial state. In one embodiment, the updated estimate of the sensor inertial state is generated by georegistering the image generated in block 408, and using the georegistered image to obtain the update estimate of the sensor inertial state. This further described below with reference to FIG. 5. Finally, in block 412, an enhanced image is generated from the retained raw sensor data and the updated estimate of the sensor inertial state.

In one embodiment, the enhanced image generated in block 412 is provided to block 410 and used to further improve the updated estimate of the sensor inertial state. Since the raw sensor data is still available, this allows for the generation of a further enhanced image when the operations of block 412 are repeated. This process can be iteratively repeated, improving the generated image and the and the estimate of the sensor inertial state until such iterations no longer sufficiently improve the estimate of the sensor inertial state.

The foregoing process may be repeated for additional raw sensor data and additional estimates of the sensor inertial state. This may be applied, for example, in embodiments using synthetic aperture techniques such as SAR (where multiple raw sensor data is taken from different locations at different points in time) or multiple sensor embodiments (where multiple raw sensor data is taken from the different locations at the same or nearly the same point in time).

Figure 4B:
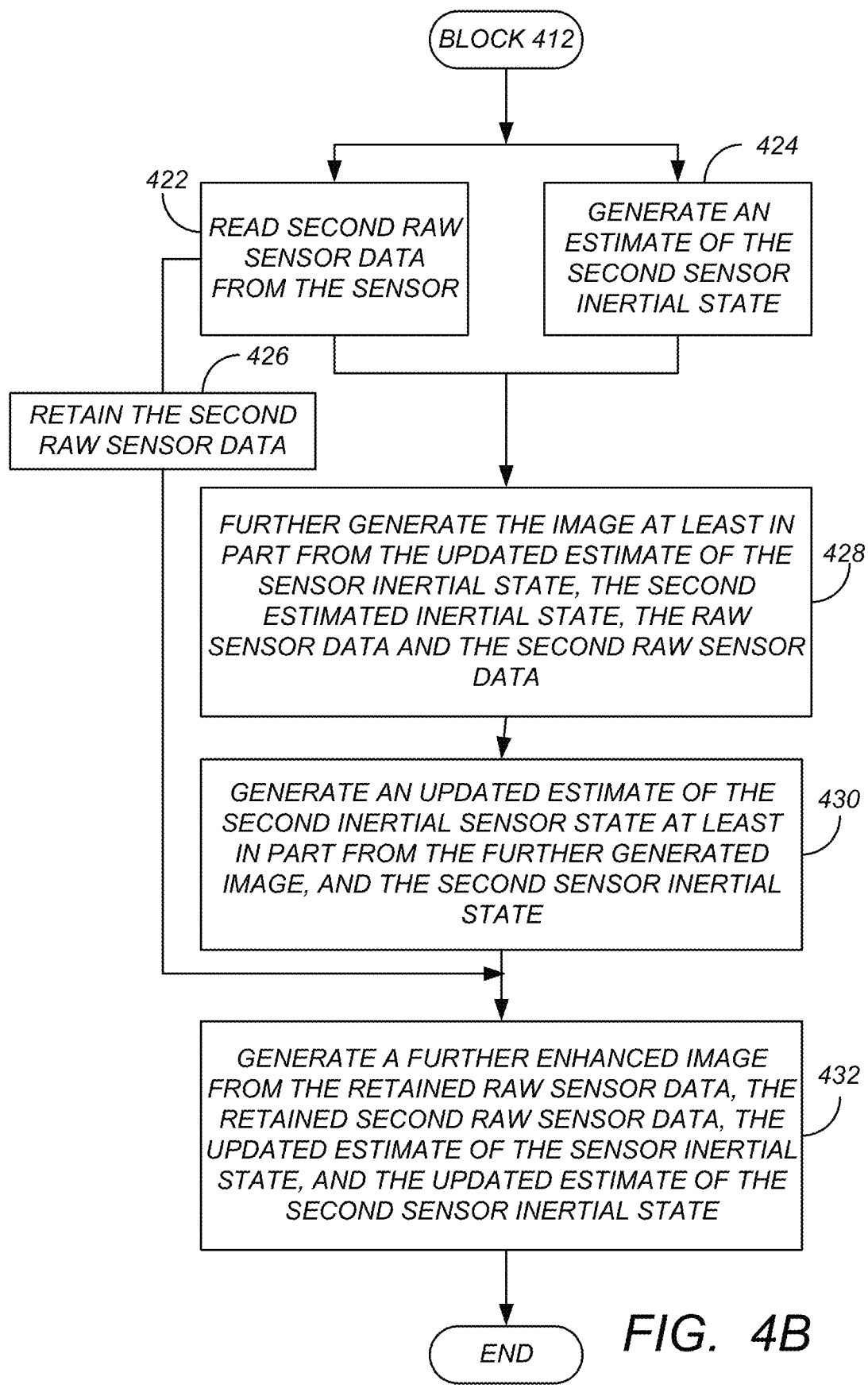

FIG. 4B is a diagram illustrating the use of additional raw sensor data and estimates of the sensor inertial state. This embodiment is useful, for example, in selected SAR applications. In block 422, second raw data is read from the sensor. In this embodiment, the sensor is the same sensor that read the first raw data described above (but at a different location at a different time). In block 424, an estimate of a second sensor inertial state is generated. The second sensor inertial state is the state of the same sensor, but at a different location (and time) than the sensor inertial state described above. In block 426, the second raw sensor date is retained (the first raw sensor data has also been retained for use).

In block 428 an image is generated. This image is generated at least in part from the updated estimate of the sensor inertial state, the estimate of the second sensor inertial state, the raw sensor data and the second raw sensor data. For example, in the SAR embodiment, the further generated image is generated from the first raw data taken at the first sensor location and the second raw data taken at the second location, as well as the state of the sensor at the locations where the raw data was taken.

In block 430, an updated estimate of the second inertial sensor state is generated. This updated estimate of the second inertial sensor state is generated at least in part from the further generated image generated in block 428 and the estimated second sensor inertial state.

Finally, in block 432, a further enhanced image is generated, using the retained raw sensor data, the retained second raw sensor data, the updated estimate of the sensor inertial state and the updated estimate of the second sensor inertial state.

Similarly to the process shown in FIG. 4A, the foregoing process may be repeated for additional raw sensor data and additional estimates of the sensor inertial state. This may be applied, for example, in embodiments using synthetic aperture techniques such as SAR (where multiple raw sensor data is taken from different locations at different points in time) or multiple sensor embodiments (where multiple raw sensor data is taken from the different locations at the same or nearly the same point in time).

Figure 4C:
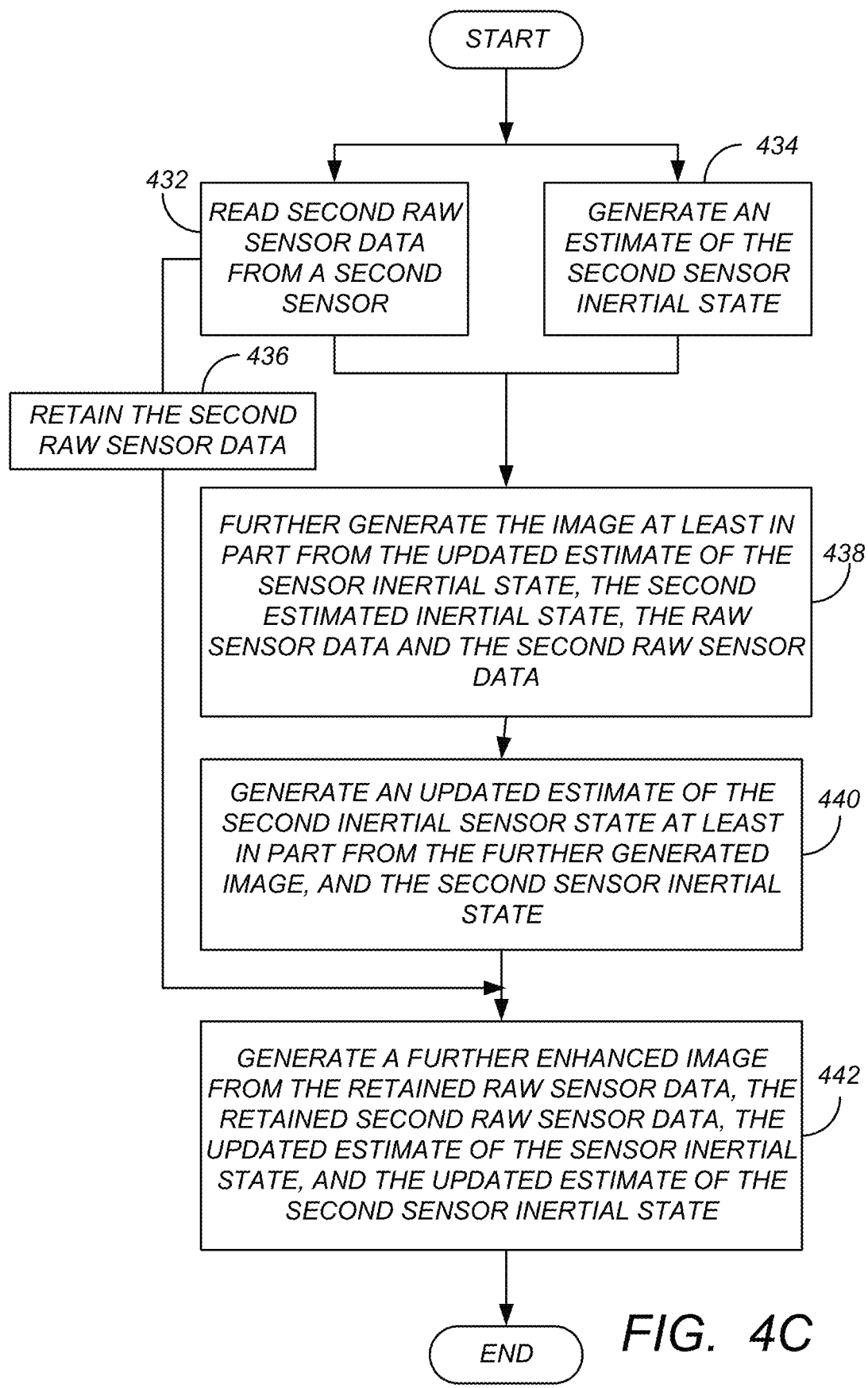

FIG. 4C is a diagram illustrating the use of additional raw sensor data and estimates of the inertial state in an embodiment using two sensors. In this embodiment, the first raw sensor data and the second raw sensor are taken from two different sensors, and may be taken at the same or different times. Block 432 reads second raw sensor data from a second sensor, and block 434 generates an estimate of the second sensor inertial state. Block 436 retains the second raw sensor data at least as long as the operations of blocks 438 and 440 are performed (the first raw sensor data has also been retained for use). In block 438, the image is further generated at least in part from the updated estimate of the sensor inertial state (of the first sensor), the second estimated inertial state (of the second sensor), and the raw data from the first sensor and the second sensor. In block 440, an updated estimate of the second inertial sensor state (of the second sensor) is generated at least in part from the further generated image and the second sensor inertial state (of the second sensor). Finally, in block 442, a further enhanced image is generated from the first retained raw sensor data, the second retained raw sensor data.

Again, similar to the embodiments discussed in connection with FIGS. 4A and 4B, the enhanced image generated in block 442 may be provided to block 440 and used to further improve the updated estimate of the second sensor inertial state. Since the second raw sensor data is still available, this allows for the generation of a further enhanced image when the operations of block 442 are repeated.

Figure 4D:
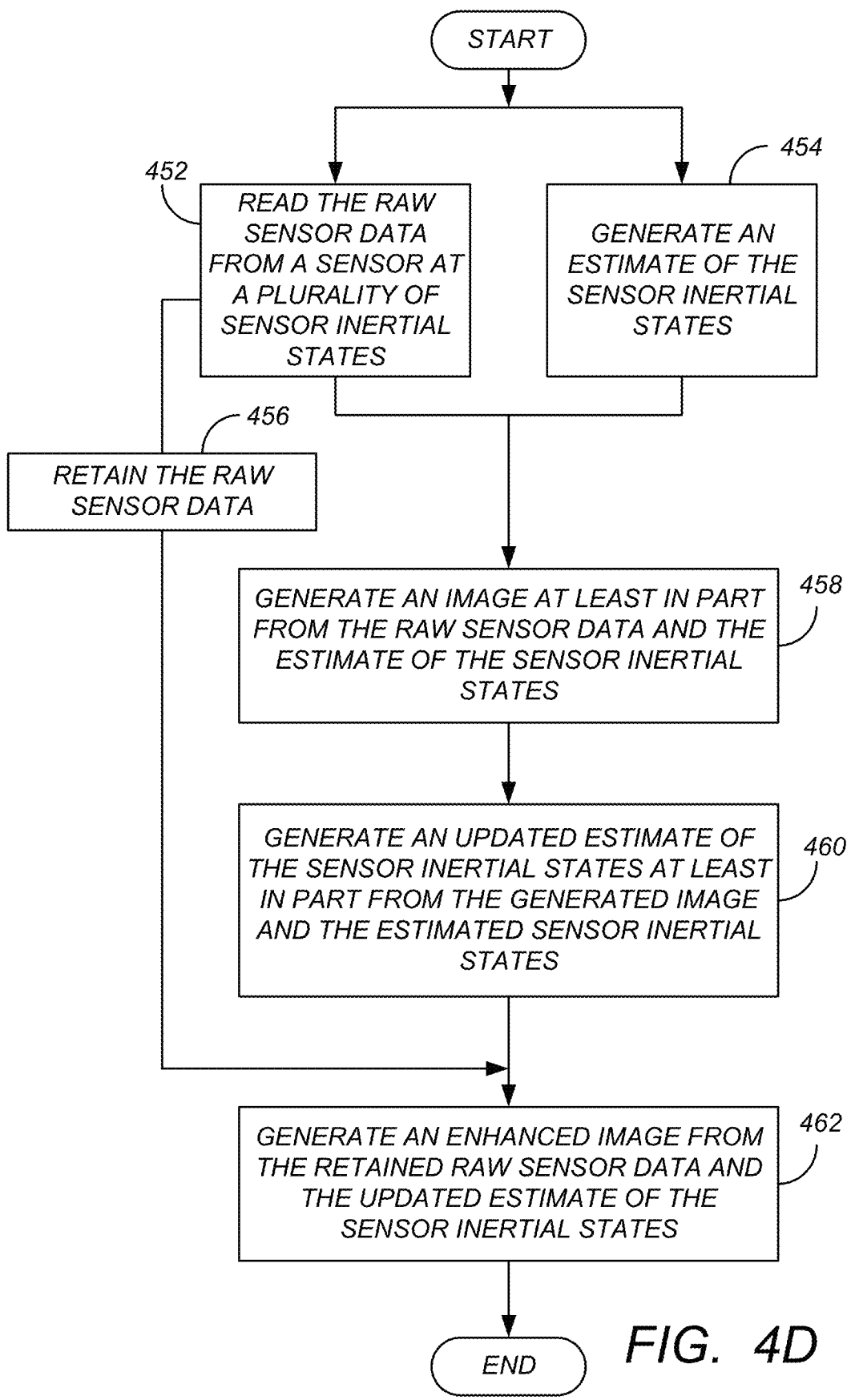

FIG. 4D is diagram of another embodiment of exemplary process steps that can be used to generate an image 206 from raw sensor data 202. In this embodiment, an image of a target 110 covering a certain area 109 at a certain resolution is desired. A prediction is generated regarding how long it will take to collect the image (time) and verifying that the image is predicted to remain within the field of view 108 of the sensor 106 during the collection. Greater resolution is achieved when more data points at different sensor locations are collected, which typically reflects in a greater period of time to collect the data. As the sensor platform 104 moves, the sensor 106 begins collection collecting raw data (in the case of a SAR, each set of raw data is obtained from a radio-frequency pulse) at a plurality of sensor positions or inertial states. The INS 114 generates estimates of the sensor position or inertial state for each set of raw data corresponding to a pulse. Each set of raw sensor data 202 is then associated with the estimate of the inertial position of the sensor 106. This may be accomplished, for example, by correlating the recorded time that the raw sensor data 202 was collected from each pulse and the time of the estimate of the inertial state of the sensor 106.

In block 458, an image 206 is generated from at least in part from the raw sensor data 202 (which includes the data sets from each of the multiple pulses) and the estimate of the inertial states of the sensor 208 corresponding to each of the raw sensor data 202 sets. In block 460, an updated estimate of the sensor inertial states is generated at least in part from the generated image and the estimated sensor inertial states. In one embodiment, this is accomplished by generating a georegistered image 212 from the generated image 206 and the reference image database 214, then generating the updated estimate of the sensor location(s), using the georegistered image 212. In block 462, an enhanced image is generated from the retained raw sensor data sets 456 and the updated estimate of the sensor inertial states.

Again, similar to the embodiments discussed in connection with FIGS. 4A-4C, the enhanced image generated in block 462 may be provided to block 460 and used to further improve the updated estimate of the sensor inertial states. Since the raw sensor data is still available, this allows for the generation of a further enhanced image when the operations of block 462 are repeated.

Further, the improved estimate of the sensor inertial state can be used to improve the estimated inertial state for future raw sensor data 202 set collections, thus further improving the generated image 206.

In the embodiments discussed in reference to FIGS. 4A-4D, the estimated sensor inertial state may include different data, depending on the sensor 106 used. For example, in embodiments in which the raw sensor data is taken at different sensor locations by the same sensor, (for example, SAR), the estimated sensor inertial state includes the sensor location in inertial space, and may also include the sensor velocity in inertial space. In embodiments (for example, using a planar sensor having an array of pixels sensitive to energy in IR, uV, or visible light bandwidths), the sensor inertial state may include the sensor location and the sensor attitude when the raw sensor data is read.

Figure 5:
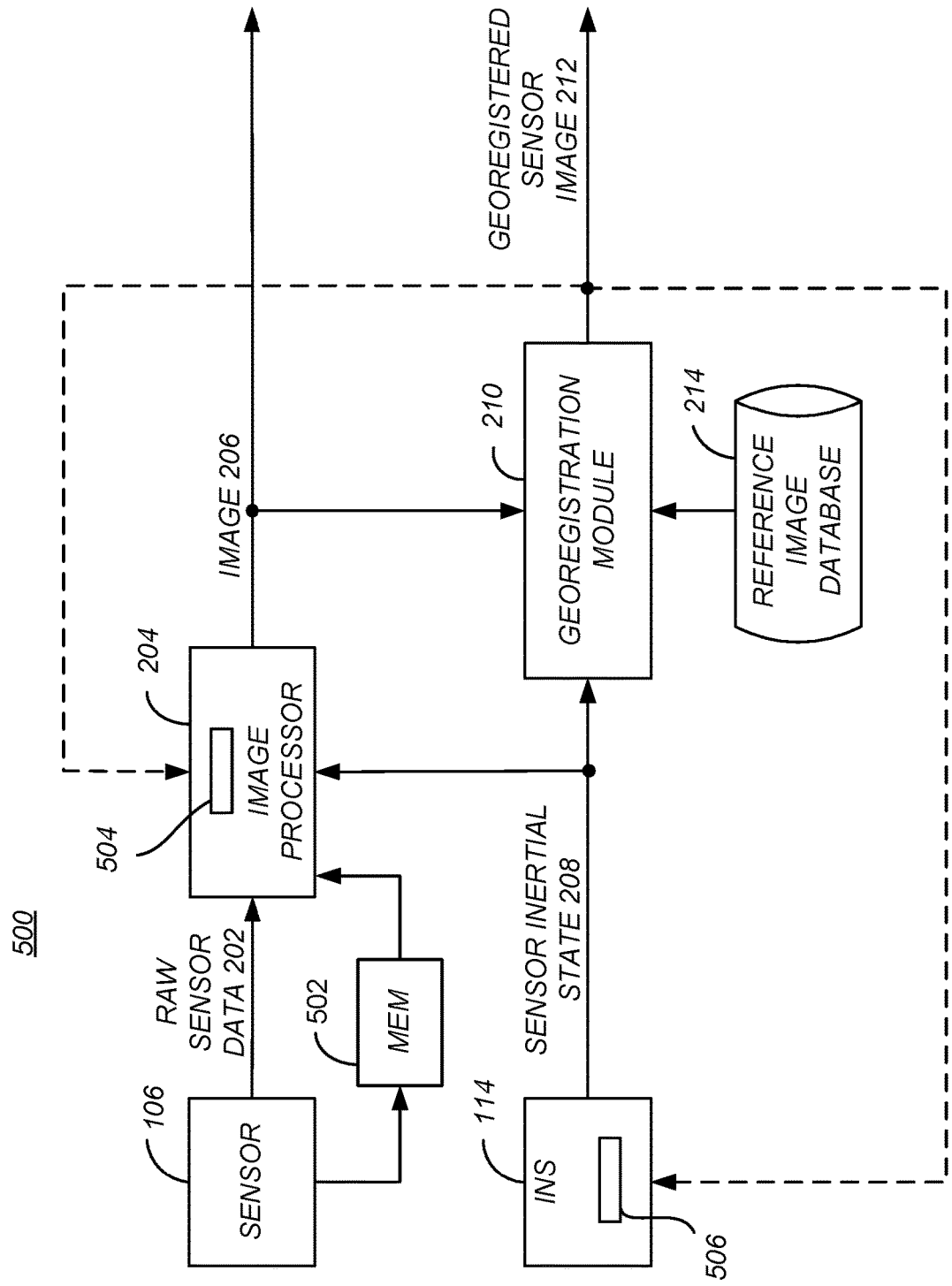
FIG. 5 is a diagram of one embodiment of an improved georegistration system.

FIG. 5 is a diagram of one embodiment of an improved georegistration system 500. Blocks 410, 430, 440 and 460 of FIGS. 4A, 4B, 4C, and 4D respectively, describe operations in which an updated estimate of the sensor inertial state (or the second inertial sensor state) is generated at least in part from the related image. This may be accomplished by the georegistration module 210, which generates a georegistered image from the generated image and a reference image database 214 and the aforementioned reference DEM database referred to above. The updated sensor inertial state is then generated at least in part from the georegistered image. This can be accomplished by comparing the georegistered image to the known features in the DEM database 340 and georegistered image as described in U.S. Patent Publication 2005/0220363 to provide additional information regarding the location of the sensor when the raw sensor data used to generate the image was read. Such comparison may be performed by a hardware, software, or firmware module 506 of the INS 114, a hardware, software, or firmware module 504 of the image processor 204 and/or a hardware, software, or firmware module of the platform processor 112.

Finally, since an enhanced image is available from the process described above, an enhanced georegistered image may be generated from the enhanced image and the updated sensor location(s). This is accomplished by providing the enhanced image 206 (created using the updated sensor inertial state 208) and the updated sensor inertial state 208 itself to the georegistration module 210. Since the georegistration module 210 now has an enhanced image and an updated (and more accurate) sensor inertial state 208, an enhanced georegistered sensor image 212 can be generated. Of course, this enhanced georegistered sensor image 212 can be used to further increase the accuracy of the sensor inertial state 208 which can in turn be used to improve the image 206, which then allows generation of a further enhanced georegistered sensor image 212. Hence, by retaining the raw sensor data 202 so that it is available to be reprocessed using sensor inertial state 208 data with improved accuracy made possible by the georegistration process, a closed loop of processing is defined which continually improves both the image and the estimate of the sensor states.

Processing Environment

Figure 6:
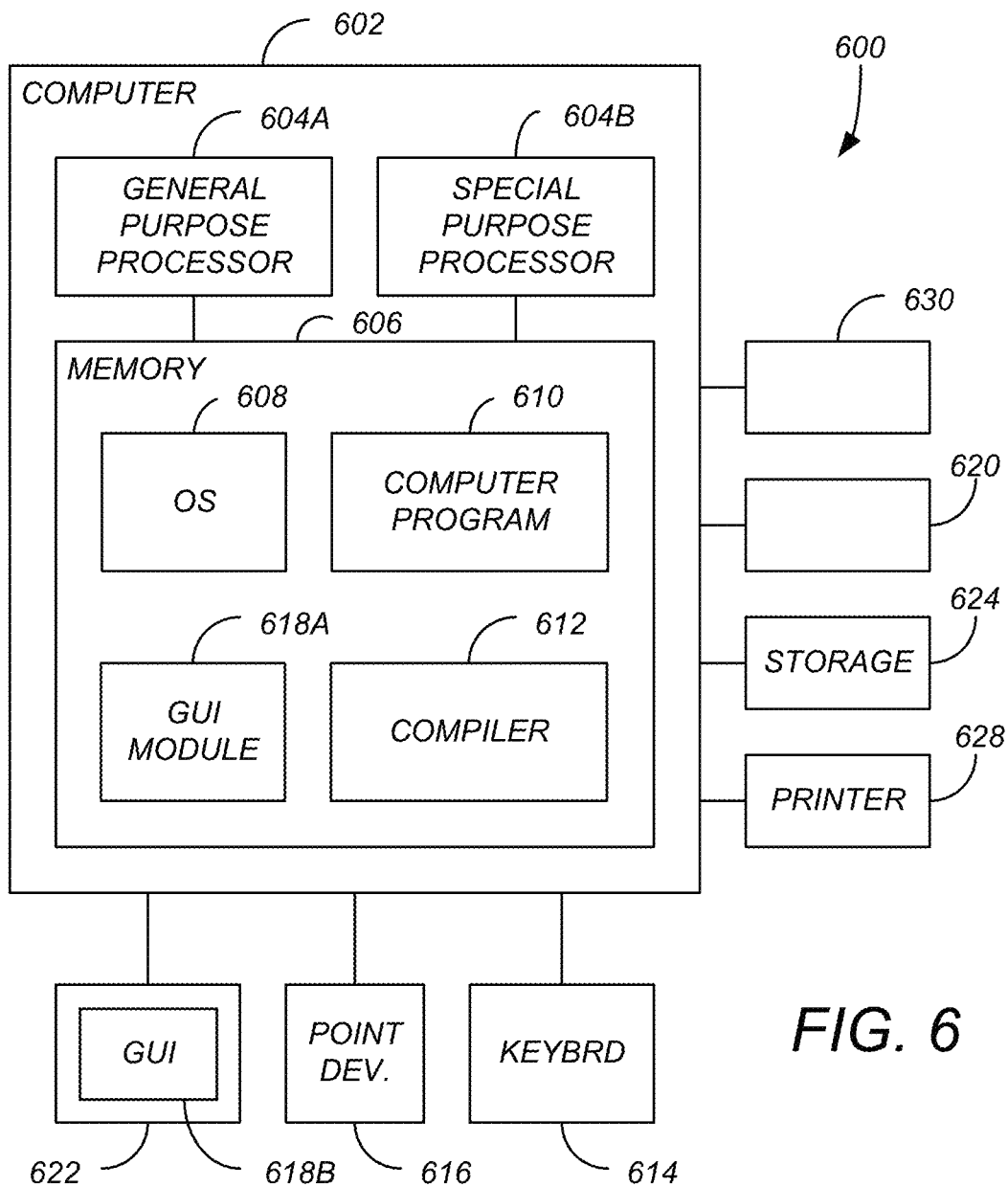
FIG. 6 illustrates an exemplary computer or system 600 that could be used to implement processing elements.

FIG. 6 illustrates an exemplary computer or system 600 that could be used to implement processing elements of the above disclosure, including the platform processor 112, image processor 204, georegistration module 210, portions of the INS 114, receiver 117 and ground station 118. The computer 602 comprises a processor 604 and a memory, such as random access memory (RAM) 606. In embodiments requiring a human interface, the computer 602 is operatively coupled to a display 622, which presents images such as windows to the user on a graphical user interface 618B. The computer 602 may be coupled to other devices, such as a keyboard 614, a mouse device 616, a printer, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618B is depicted as a separate module, the instructions performing the GUI functions can be resident or distributed in the operating system 608, the computer program 610, or implemented with special purpose memory and processors. The computer 602 also implements a compiler 612 which allows an application program 610 written in a programming language such as Java, C++, C#, or other language to be translated into processor 604 readable code. After completion, the application 610 accesses and manipulates data stored in the memory 606 of the computer 602 using the relationships and logic that was generated using the compiler 612. Analogous results can be accomplished with field programmable gate arrays (FPGAs). The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the operations herein described. Computer program 610 and/or operating instructions may also be tangibly embodied in memory 606 and/or data communications devices 630, thereby making a computer program product or article of manufacture. As such, the terms "article of manufacture," "program storage device" and "computer program product" as used herein are intended to encompass a computer program accessible from any computer readable device or media.

It is understood that the foregoing embodiment of the computer system includes peripherals (e.g. display 622, GUI module 618A, GUI 618, mouse device 616, keyboard 614, printer 628 or compiler 612) that may be useful in the ground station 118 and similar applications, but unnecessary not included in the other processing elements.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of enhancing an image of a scene, comprising:
    generating a plurality of raw sensor data sets by a sensor;
    reading the plurality of raw sensor data sets with an image processor, each raw sensor data set representing one of a plurality of images of the scene and read from the sensor at a plurality of sensor locations, comprising:
    generating, by an inertial navigation system, an estimate of each of the plurality of sensor locations associated with the plurality of raw sensor data sets;
    retaining each of the raw sensor data sets by the sensor while performing steps comprising:
        generating the image of the scene by the image processor, the image generated at least in part from the plurality of estimated sensor locations and the plurality of read raw sensor data sets; and
        generating, by a georegistration module, an updated estimate of each of the plurality of sensor locations, the updated estimate of each of the sensor locations generated at least in part from the generated image of the scene and the plurality of estimated sensor locations, comprising:
            generating a georegistered image from the generated image of the scene and a reference image database; and
            generating the updated estimate of each of the plurality of sensor locations at least in part from the georegistered image; and
    generating, by the image processor, an enhanced image of the scene having greater accuracy than the generated image, the enhanced image generated from the retained raw sensor data sets and the updated estimate of the plurality of each of the sensor locations; and
    generating, by the georegistration module, an enhanced georegistered image from the enhanced image and the updated estimate of each of the plurality of sensor locations.

2. The method of claim 1, wherein the sensor comprises a synthetic aperture radar (SAR).

3. The method of claim 1, wherein the enhanced image has less distortion than the image, the distortion comprising at least one of out of plane acceleration, foreshortening, and layover.

4. The method of claim 1, wherein the sensor comprises a planar imaging sensor.

5. The method of claim 4, wherein the planar imaging sensor comprises a camera operating at least one of visible wavelengths, infrared wavelengths, and ultraviolet wavelengths.

6. The method of claim 4, wherein the planar imaging sensor is oriented in tilt and pan directions via a turret.

7. The method of claim 1, wherein the sensor is mounted on an unmanned air vehicle.

8. An apparatus for enhancing an image of a scene, comprising:
    a sensor for generating a plurality of raw data sets;
    an image processor, communicatively coupled to the sensor, for reading the plurality of raw sensor data sets, each raw sensor data set representing one of a plurality of images of the scene from the sensor, each raw sensor data set read from the sensor at a plurality of sensor locations;
    an inertial navigation system, communicatively coupled to the sensor, for generating an estimate of each of the plurality of sensor locations;

wherein the image processor is further communicatively coupled to the inertial navigation system, and generates an image of the scene, the image generated at least in part from the estimate of each of the plurality of sensor locations and the plurality of read raw sensor data sets; and a georegistration module, communicatively coupled to the inertial navigation system and the image processor, for generating an updated estimate of each of the plurality of sensor locations by generating a georegistered image from the generated image of the scene and a reference image database, and generating the updated estimate of each of the plurality of sensor locations at least in part from the georegistered image;

wherein:

the sensor is configured to retain each of the raw sensor data sets while the image of the scene is generated at least in part from the plurality of raw sensor data sets and the updated estimate of each of the plurality of sensor locations is generated; and the image processor is configured to generate an enhanced image of the scene having greater accuracy than the generated image of the scene, the enhanced image generated from the retained raw sensor data sets and the updated estimate of the plurality of each of the sensor locations; and the georegistration module is configured to generate an enhanced georegistered image from the enhanced image of the scene and the updated estimate of each of the plurality of sensor locations.

9. The apparatus of claim 8, wherein the sensor comprises a synthetic aperture radar (SAR).

10. The apparatus of claim 8, wherein the sensor comprises a planar imaging sensor.

11. The apparatus of claim 10, wherein the planar imaging sensor comprises a camera operating at least one of visible wavelengths, infrared wavelengths, and ultraviolet wavelengths.

12. The apparatus of claim 11, wherein the sensor is disposed on a turret.

13. The apparatus of claim 11, wherein the planar imaging sensor is disposed on a platform.

14. The apparatus of claim 8, wherein the sensor is mounted on an unmanned air vehicle.

15. An apparatus for enhancing an image of a scene, comprising:

means for reading a plurality of raw sensor data sets, each raw sensor data set representing one of a plurality of images of the scene read from a sensor at a plurality of sensor locations;

means for generating an estimate of each of the plurality of sensor locations associated with the plurality of raw sensor data sets;

means for retaining each of the raw sensor data sets;

means for generating the image of the scene, the image generated at least in part from the plurality of estimated sensor locations and the plurality of read raw sensor data sets while each of the raw sensor data sets are retained;

means for generating an updated estimate of each of the plurality of sensor locations while each of the raw sensor data sets are retained, the updated estimate of the each of the sensor locations generated at least in part from the generated image of the scene and the plurality of estimated sensor locations, comprising:

means for generating a georegistered image from the generated image of the scene and a reference image database; and means for generating the updated estimate of each of the plurality of sensor locations at least in part from the georegistered image; and means for generating an enhanced image of the scene having greater accuracy than the generated image, the enhanced image generated from the retained raw sensor data sets and the updated estimate of the plurality of each of the sensor locations; and means for generating an enhanced georegistered image from the enhanced image and the updated estimate of each of the plurality of sensor locations.

16. The apparatus of claim 15, wherein the sensor comprises a synthetic aperture radar (SAR).

17. The apparatus of claim 15, wherein the sensor comprises a planar imaging sensor.

18. The apparatus of claim 17, wherein the planar imaging sensor comprises a camera operating at least one of visible wavelengths, infrared wavelengths, and ultraviolet wavelengths.

19. The apparatus of claim 17, wherein the planar imaging sensor disposed on a turret.

20. The apparatus of claim 17, wherein the planar imaging sensor is disposed on a platform.

* * * * *